(12) United States Patent
Fukujima Goto et al.

(10) Patent No.: US 9,485,285 B1
(45) Date of Patent: *Nov. 1, 2016

(54) ASSISTING THE AUTHORING OF POSTS TO AN ASYMMETRIC SOCIAL NETWORK

(71) Applicant: Google Inc., Mountain View, CA (US)

(72) Inventors: Samuel Shoji Fukujima Goto, Mountain View, CA (US); Joseph Rideout, Ontario (CA); Braden F. Kowitz, San Francisco, CA (US); Todd Jackson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,583

(22) Filed: Nov. 11, 2013

Related U.S. Application Data

(63) Continuation of application No. 12/702,155, filed on Feb. 8, 2010, now Pat. No. 8,582,801.

(51) Int. Cl.
| | | |
|---|---|---|
| *G06K 9/00* | (2006.01) | |
| *H04L 29/06* | (2006.01) | |
| *G06F 3/0481* | (2013.01) | |
| *G06Q 30/02* | (2012.01) | |

(52) U.S. Cl.
CPC ......... *H04L 65/403* (2013.01); *G06F 3/04817* (2013.01); *G06Q 30/0277* (2013.01)

(58) Field of Classification Search
USPC ........................................................ 382/100
See application file for complete search history.

(56) References Cited

U.S. PATENT DOCUMENTS

| | | | |
|---|---|---|---|
| 6,285,999 B1 | 9/2001 | Page | |
| 6,480,885 B1 | 11/2002 | Olivier | |
| 7,069,308 B2 | 6/2006 | Abrams | |
| 7,136,915 B2 | 11/2006 | Rieger et al. | |
| 7,593,740 B2 | 9/2009 | Crowley | |
| 7,818,392 B1 | 10/2010 | Martino et al. | |
| 7,840,502 B2* | 11/2010 | Li | G06Q 30/02 706/12 |
| 7,873,996 B1 | 1/2011 | Emigh et al. | |
| 8,214,446 B1 | 7/2012 | Siegel et al. | |
| 8,224,714 B2 | 7/2012 | Yost | |

(Continued)

FOREIGN PATENT DOCUMENTS

| | | |
|---|---|---|
| KR | 10-2009-0091854 A | 8/2009 |
| WO | 2008/154106 A1 | 12/2008 |

OTHER PUBLICATIONS i E. A. Vander Veer, Facebook: the missing manual, first edition, Published by O'Reilly Media, Inc.*

(Continued)

*Primary Examiner* — Gregory F Cunningham

(57) ABSTRACT

Methods, systems, and apparatus, including computer programs encoded on a computer storage medium, for assisting the authoring of posts to an asymmetric social network. In one aspect, a method performed by a system of one or more data processing devices includes receiving, at the system, an identification of an electronic document that is available on the Internet, the system identifying image content in the electronic document, the system filtering the identified image content, the system triggering presentation of the filtered image content to an author of a post to an asymmetric social network, the system receiving a selection of a first image from amongst the presented image content, and the system adding the first image to a post to the asymmetric social network.

20 Claims, 10 Drawing Sheets

(56) References Cited

U.S. PATENT DOCUMENTS

| | | | |
|---|---|---|---|
| 8,370,062 B1 | 2/2013 | Starenky et al. | |
| 8,413,060 B1 | 4/2013 | Agrawal | |
| 8,417,698 B2 | 4/2013 | Yoo | |
| 8,417,729 B2 | 4/2013 | Baker | |
| 8,474,628 B1 | 7/2013 | Appelman et al. | |
| 8,582,801 B2* | 11/2013 | Goto et al. | 382/100 |
| 2002/0103892 A1 | 8/2002 | Rieger | |
| 2002/0144154 A1 | 10/2002 | Tomkow | |
| 2003/0172120 A1 | 9/2003 | Tomkow et al. | |
| 2004/0221014 A1 | 11/2004 | Tomkow | |
| 2004/0230657 A1 | 11/2004 | Tomkow | |
| 2005/0021963 A1 | 1/2005 | Tomkow | |
| 2005/0198511 A1 | 9/2005 | Tomkow | |
| 2005/0223077 A1 | 10/2005 | Vellanki et al. | |
| 2006/0031775 A1 | 2/2006 | Sattler et al. | |
| 2006/0252547 A1 | 11/2006 | Mizrahi et al. | |
| 2006/0284744 A1 | 12/2006 | Shotland | |
| 2006/0284893 A1 | 12/2006 | Hlad et al. | |
| 2006/0294571 A1 | 12/2006 | Moore et al. | |
| 2007/0016651 A1 | 1/2007 | Blagsvedt et al. | |
| 2007/0127555 A1 | 6/2007 | Lynch | |
| 2007/0143416 A1 | 6/2007 | Daigle et al. | |
| 2007/0143417 A1 | 6/2007 | Daigle | |
| 2007/0143435 A1 | 6/2007 | Daigle et al. | |
| 2007/0150368 A1 | 6/2007 | Arora et al. | |
| 2007/0174402 A1 | 7/2007 | Tomkow | |
| 2007/0242131 A1 | 10/2007 | Sanz-Pastor et al. | |
| 2007/0293253 A1 | 12/2007 | Matsumoto et al. | |
| 2008/0005341 A1 | 1/2008 | Subbian | |
| 2008/0022302 A1 | 1/2008 | Tanaka et al. | |
| 2008/0098087 A1 | 4/2008 | Lubeck | |
| 2008/0188261 A1 | 8/2008 | Arnone | |
| 2008/0189367 A1 | 8/2008 | Okumura | |
| 2008/0215426 A1 | 9/2008 | Guldimann et al. | |
| 2008/0222551 A1 | 9/2008 | Takamune | |
| 2008/0227385 A1 | 9/2008 | Bappu et al. | |
| 2008/0307472 A1 | 12/2008 | Tanaka et al. | |
| 2008/0313208 A1 | 12/2008 | Hourselt et al. | |
| 2008/0313256 A1 | 12/2008 | Kanazawa et al. | |
| 2009/0006371 A1 | 1/2009 | Denoue et al. | |
| 2009/0049144 A1 | 2/2009 | Suzuki et al. | |
| 2009/0055485 A1 | 2/2009 | Tsai et al. | |
| 2009/0070426 A1 | 3/2009 | McCauley et al. | |
| 2009/0077182 A1 | 3/2009 | Banjara et al. | |
| 2009/0083658 A1 | 3/2009 | Ito et al. | |
| 2009/0106697 A1 | 4/2009 | Ward et al. | |
| 2009/0144392 A1 | 6/2009 | Wang et al. | |
| 2009/0164431 A1 | 6/2009 | Zivkovic et al. | |
| 2009/0164574 A1 | 6/2009 | Hoffman | |
| 2009/0222551 A1 | 9/2009 | Neely et al. | |
| 2009/0259650 A1 | 10/2009 | Schuil | |
| 2009/0265429 A1 | 10/2009 | Gestsson et al. | |
| 2009/0271244 A1 | 10/2009 | Kalasapur et al. | |
| 2009/0282002 A1 | 11/2009 | Reeder et al. | |
| 2009/0291665 A1 | 11/2009 | Gaskarth et al. | |
| 2009/0313346 A1* | 12/2009 | Sood | G06Q 10/10 709/207 |
| 2009/0319518 A1 | 12/2009 | Koudas et al. | |
| 2010/0003659 A1 | 1/2010 | Edmonds | |
| 2010/0004857 A1 | 1/2010 | Pereira et al. | |
| 2010/0015975 A1 | 1/2010 | Issa et al. | |
| 2010/0017237 A1 | 1/2010 | Dalesandro et al. | |
| 2010/0088187 A1 | 4/2010 | Courtney et al. | |
| 2010/0106784 A1 | 4/2010 | Wang et al. | |
| 2010/0115114 A1 | 5/2010 | Headley | |
| 2010/0144323 A1 | 6/2010 | Collins et al. | |
| 2010/0153404 A1 | 6/2010 | Ghosh et al. | |
| 2010/0169363 A1 | 7/2010 | Gaedcke | |
| 2010/0199340 A1 | 8/2010 | Jonas et al. | |
| 2010/0205430 A1 | 8/2010 | Chiou et al. | |
| 2010/0241964 A1 | 9/2010 | Belinsky et al. | |
| 2010/0268830 A1 | 10/2010 | McKee et al. | |
| 2010/0273447 A1 | 10/2010 | Mann et al. | |
| 2010/0274792 A1 | 10/2010 | Bhangi | |
| 2010/0274815 A1 | 10/2010 | Vanasco | |
| 2010/0287033 A1 | 11/2010 | Mathur | |
| 2010/0287109 A1 | 11/2010 | Li et al. | |
| 2010/0293029 A1 | 11/2010 | Olliphant | |
| 2010/0306099 A1 | 12/2010 | Hirson et al. | |
| 2010/0313252 A1 | 12/2010 | Trouw | |
| 2010/0323667 A1 | 12/2010 | Oschwald et al. | |
| 2010/0333019 A1 | 12/2010 | Oschwald et al. | |
| 2011/0016179 A1 | 1/2011 | Bechtel | |
| 2011/0022602 A1 | 1/2011 | Luo et al. | |
| 2011/0055723 A1 | 3/2011 | Lightstone et al. | |
| 2011/0078190 A1 | 3/2011 | Samuel et al. | |
| 2011/0099507 A1 | 4/2011 | Nesladek | |
| 2011/0106857 A1 | 5/2011 | Besombe et al. | |
| 2011/0125770 A1 | 5/2011 | Battestini et al. | |
| 2011/0154223 A1 | 6/2011 | Whitnah et al. | |
| 2011/0167125 A1 | 7/2011 | Achlioptas | |
| 2011/0196932 A1 | 8/2011 | Jackson et al. | |
| 2011/0196933 A1 | 8/2011 | Jackson et al. | |
| 2011/0212430 A1 | 9/2011 | Smithmier et al. | |
| 2011/0225257 A1 | 9/2011 | Tilden et al. | |
| 2011/0238762 A1 | 9/2011 | Soni et al. | |
| 2011/0264528 A1 | 10/2011 | Whale | |
| 2011/0314111 A1 | 12/2011 | Wang et al. | |
| 2012/0042020 A1 | 2/2012 | Kolari et al. | |
| 2012/0066312 A1 | 3/2012 | Kendekar et al. | |
| 2012/0110135 A1 | 5/2012 | Sparks et al. | |
| 2012/0135744 A1 | 5/2012 | Curtis et al. | |
| 2012/0143963 A1 | 6/2012 | Kennberg et al. | |
| 2012/0233256 A1 | 9/2012 | Shaham et al. | |
| 2014/0304260 A1 | 10/2014 | Ulm | |

OTHER PUBLICATIONS

IAB recommendations, examples of standard web advert sizes; Published Nov. 2009.*

Non-Final Office Action received for U.S. Appl. No. 12/702,124, D Aug. 26, 2016.*

International Preliminary Report on Patentability for corresponding International Patent Application No. PCT/US2011/0235920, mailed Aug. 23, 2012. 7 pages.

E. A. Vander Veer, Facebook: the missing manual, first edition, Published by O'reilly Media, Inc. 2008.

International Search Report issued in PCT/US2011/023590 on Sep. 27, 2011.

Uncertified machine translation of KR 10-2009-0091854.

Hammitt, Jennifer, document entitled "How to Post Links on Facebook," updated: May 5, 2010 available at http:?? www.ehow.com/how_4576098_post-links-facebook.html.

Hollows, Phil, document entitled "Automatic Facebook posts done right," Aug. 16, 2010, available at http://kb.feedblitz.com/article/AA-00576/0/Automatic-Facebook-posts-done-right.html/.

Wikipedia, "Foursquare (service)/"[Retrieved on Dec. 7, 2010] Retrieved from the Internet: http://en.wikipedia/org/wiki/four-square_%28service%29?, pp. 1.

IPRP/Written Opinion and ISR for PCT/US2011420641 mailed May 2, 2011, 8 pages.

'Reading gets personal with popular items and personalized ranking' [online]. The Official Google Blog, Oct. 22, 2009, [retrieved on Jan. 27, 2010]. Retrieved from the Internet: http://googleblog.blogspot.com/2009/10/treading-gets-personal-with-popular-items-and-personalized-ranking.

Twitter' [online], Wikipedia, [Retrieved on Jan. 27, 2010, Retrieved from the Internet: http://en.wikipedia.org/wiki/twitter.

'Gmail' [online], Wikipedia, Mar. 20, 2010, [retrieved on Mar. 22, 2010]. Retrieved from the Internet: http://en/wikipedia.org/w/index.php?title-gmail&oldid-350982667.

Facebook rolls out revamped news feed' [online], The Christian Science Monitor, Oct. 23, 2009, [retrieved on Jan. 27, 2010]. Retrieved from the Internet: http://www.csmonitorcom/layout/set/print/content/view/print/261662.

Smith, Justin, document entitled "Facebook Now Suggesting Friends Found in Imported Contact Lists?" Jun. 12, 2009, Available at http://www.insidefacebook.com/2009/06/12/facebook-now-suggesting-friends-found-in-imported-contact-lists/.

(56) References Cited

OTHER PUBLICATIONS

Taylor, Dave, document entitled "How to Find Your Friends on Face Book With the Facebook Friend Finder," Believed to be available prior to Dec. 4, 2008, Available at http://www.askdavetaylor.com/how_to_find_friends_facebook_facebook_friend_finder.html.
Allmond, Kenya, document entitled "Facebook Friend Finder: What You May Not Know About Your Data," Jun. 22, 2009, Available at http://gdgtgrl.net/2009/06/22/facebook-friend-finder-what-you-may-not-know-about-your-data/.
Google Groups, "foursquare API." [Retrieved on Dec. 7, 2010] Retrieved from the Internet: http://groups.google.com/group/foursquare-api/web/api-documentation?pli=1>, pp. 1-12.
Purdy, Kevin, "FourWhere Maps Out Foursquare Tips for Everybody," Lifehacker; Mar. 9, 2010, [Retrieved on Dec. 7, 2010] Retrieved from the Internet: http://lifehacker.com/5489053/fourwhere-maps-out-foursquare-tips-for-everybody8/15/13, pp. 1-2.
Thornton, James, "Find shops, restaurants, bars and amenities round you." Softonic: Let's Download!; Jan. 25, 2010 [Retrieved on Jan. 27, 2010] Retrieved from the Internet:http://aroundme.ensoftonic.com/iphone>, pp. 1-4.
Notice of Allowance dated May 2, 2013 for related U.S. Appl. No. 12/962,002.
Non-Final Rejection dated Mar. 2, 2012 for related U.S. Appl. No. 12/756,681.
Final Rejection dated Sep. 27, 2012 for related U.S. Appl. No. 12/756,681.
Notice of Allowance dated Apr. 29, 2014 for related U.S. Appl. No. 12/756,681.
Non-Final Rejection dated Apr. 3, 2013 for related U.S. Appl. No. 12/702,124.
Non-Final Rejection dated Jan. 13, 2015 for related U.S. Appl. No. 12/702,124.
Final Rejection dated Sep. 16, 2013 for related U.S. Appl. No. 12/702,124.
Non-Final Rejection dated Feb. 11, 2013 for related U.S. Appl. No. 12/702,155.
Notice of Allowance dated Jul. 12, 2013 for related U.S. Appl. No. 12/702,155.
Notice of Allowance dated Oct. 15, 2012 for related U.S. Appl. No. 12/702,022.
Non-Final Rejection dated Apr. 26, 2012 for related U.S. Appl. No. 12/702,022.
Non-Final Rejection dated Sep. 17, 2012 for related U.S. Appl. No. 12/962,022.
International Search Report and Written Opinion in International Application No. PCT/US2011/063794, dated Feb. 7, 2012, 10 pages.
Final Office Action dated Jul. 30, 2015 for U.S. Appl. No. 12/702,124.
Notice of Allowance dated Jul. 2, 2015 for U.S. Appl. No. 13/968,980.
Patent Examination Report No. 1 mailed Jul. 22, 2015 in Australian Patent Application No. 2011253646.
"Notice of Allowance", received for U.S. Appl. No. 13/968,980, Feb. 8, 2016, 23 pages.
Non-Final Office Action received for U.S. Appl. No. 12/702,124, Aug. 26, 2016.

\* cited by examiner

ASSISTING THE AUTHORING OF POSTS TO AN ASYMMETRIC SOCIAL NETWORK

CROSS-REFERENCE TO RELATED APPLICATIONS

This application is a continuation of U.S. application Ser. No. 12/702,155, filed Feb. 8, 2010, the entire contents of which are all hereby incorporated herein by reference.

BACKGROUND

This specification relates to assisting the authoring of posts to an asymmetric social network.

An asymmetric social network is a social network in which a first member's relationship to a second member is not necessarily the same as the second member's relationship to the first member. Since the character of the social interaction between members in a member network can be defined in accordance with the nature of the relationship between those members, a first member in an asymmetric social network may interact with a second member in ways that differ from the social interaction provided for the second member to interact with the first member.

For the sake of comparison, in a symmetric social network, related members necessarily share the same relationship with one another. Examples of such symmetric social networks include FACEBOOK, LINKEDIN, and MYSPACE, where two or more members establish bidirectionally equivalent "friend" or other relationships generally using an invitation/response protocol that effectively requires the consent of both members to the relationship. Such bidirectionally equivalent relationships provide the same social interaction possibilities to the related members.

In contrast, without relationships being constrained to bidirectional equivalency, asymmetric social networks provide differing social interaction possibilities to members. An example of such an asymmetric social network is TWITTER, where a first member may be a follower of a second member without the second member necessarily being a follower of the first. Indeed, in many asymmetric social networks, a second member need not even know a first member's identity even though the first member has a relationship to the second member.

In some implementations, asymmetric social networks limit the size of members' posts to the network. Such asymmetric social networks, also referred to as "microblogs," generally limit the size of a post to the size of a Short Message Service (SMS) or other text messaging standard message. Such standards are designed for use with mobile handsets, where communications bandwidth and input/output capabilities are more limited than in desktop computers with a high speed data connection.

SUMMARY

This specification relates to assisting the authoring of posts to an asymmetric social network. A post is a user submission that is re-transmitted to the group of people who are associated with the author.

In a first aspect, a method performed by a system of one or more data processing devices includes receiving, at the system, an identification of an electronic document that is available on the Internet, the system identifying image content in the electronic document, the system filtering the identified image content, the system triggering presentation of the filtered image content to an author of a post to an asymmetric social network, the system receiving a selection of a first image from amongst the presented image content, and the system adding the first image to a post to the asymmetric social network.

This first aspect and the second and third aspects can include one or more of the following features. Filtering the identified image content can include identifying an advertisement in the electronic document and separating the identified advertisement from the filtered image content. Identifying the advertisement can include categorizing an image having an aspect ratio equal to or greater than 3:1 as the advertisement. Filtering the identified image content can include identifying at least one of an icon or a decorative element in the electronic document and separating the at least one of the icon or decorative element from the filtered image content. Identifying the at least one of the icon or the decorative element can include categorizing an image that is smaller than thirty pixels on any side as the at least one of the icon or the decorative element. The method can include the system triggering presentation of a likeness of a screenshot of the electronic document to an author of the post, the system receiving an approval of inclusion of a likeness of a screenshot of the electronic document in the post, and the system adding the likeness of the screenshot to the post. The system can include a server and a mobile device that displays a user interface that assists in authoring of posts to an asymmetric social network.

In a second aspect, a computer storage medium encoded with a computer program. The program includes instructions that when executed by one or more data processing devices cause the one or more data processing devices to perform operations. The operations include displaying, at a mobile digital data processing device, a user interface to an author of a post to a social network, receiving the author's selection of a first image from amongst the image content, the first image selected for inclusion in the post to the social network, receiving the author's approval of inclusion of a screenshot of the electronic document in the post to the social network, causing the post to the social network to include a likeness of the selected first image and a likeness of the screenshot of the electronic document. The user interface includes thumbnail likenesses of image content from an electronic document available on the Internet and a thumbnail likeness of a screenshot of the electronic document.

This second aspect and the first and third aspects can include one or more of the following features. Displaying the user interface can also include displaying an input field to receive an identifier of the electronic document from the author. Displaying the user interface further can also include displaying an input field to receive a search query from the author. Displaying the user interface can also include displaying an indication of the author's selection of the first image in the user interface. Displaying the user interface can also include displaying a description of text in the body of content of the electronic document. Displaying the user interface can also include displaying an interactive navigational element to receive user interaction triggering a presentation of thumbnail likenesses of other image content from the electronic document. The thumbnail likenesses of image content from the electronic document can be presented in an order that corresponds with a calculated probability that the images are desirable for inclusion in the post. Displaying the user interface can also include displaying a text entry field to receive a text of the post to the social network. Causing the post to the social network to include the likenesses of the selected first image and the screenshot can include posting the likenesses of the selected first image, the screenshot, and the text in the text entry field in the post.

In a third aspect, a system includes a mobile data processing device comprising a user interface to assist in authoring of posts to an asymmetric social network and a server. The user interface includes thumbnail likenesses of image content available on the Internet, a text entry field to receive text for inclusion in a post to the asymmetric social network, and an indication of an author's selection of a first image and a second image of the image content for inclusion in the post to the asymmetric social network. The server includes one or more data processing devices operable to interact with the mobile data processing device to assist in the authoring of posts to the asymmetric social network. The server is configured to trigger presentation of the thumbnail likenesses of the image content and to post the post to the asymmetric social network. The posted post is to include the text received by text entry field, a likeness of the first image, and a likeness of the second image.

This third aspect and the first and second aspects can include one or more of the following features. The user interface can include an input element operative to receive an identification of an electronic document that is available on the Internet. The image content can be found on the electronic document. The user interface can include a likeness of a screenshot of the electronic document. The user interface can include an search query input field to receive a search query from the author. The image content can be responsive to a first search query received in the search query input field. The user interface can include an interactive navigational element to receive user interaction triggering a presentation of thumbnail likenesses of other image content available on the Internet. The thumbnail likenesses of the image content can be presented in an order that corresponds with a calculated probability that the images are desirable for inclusion in the post to the asymmetric social network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
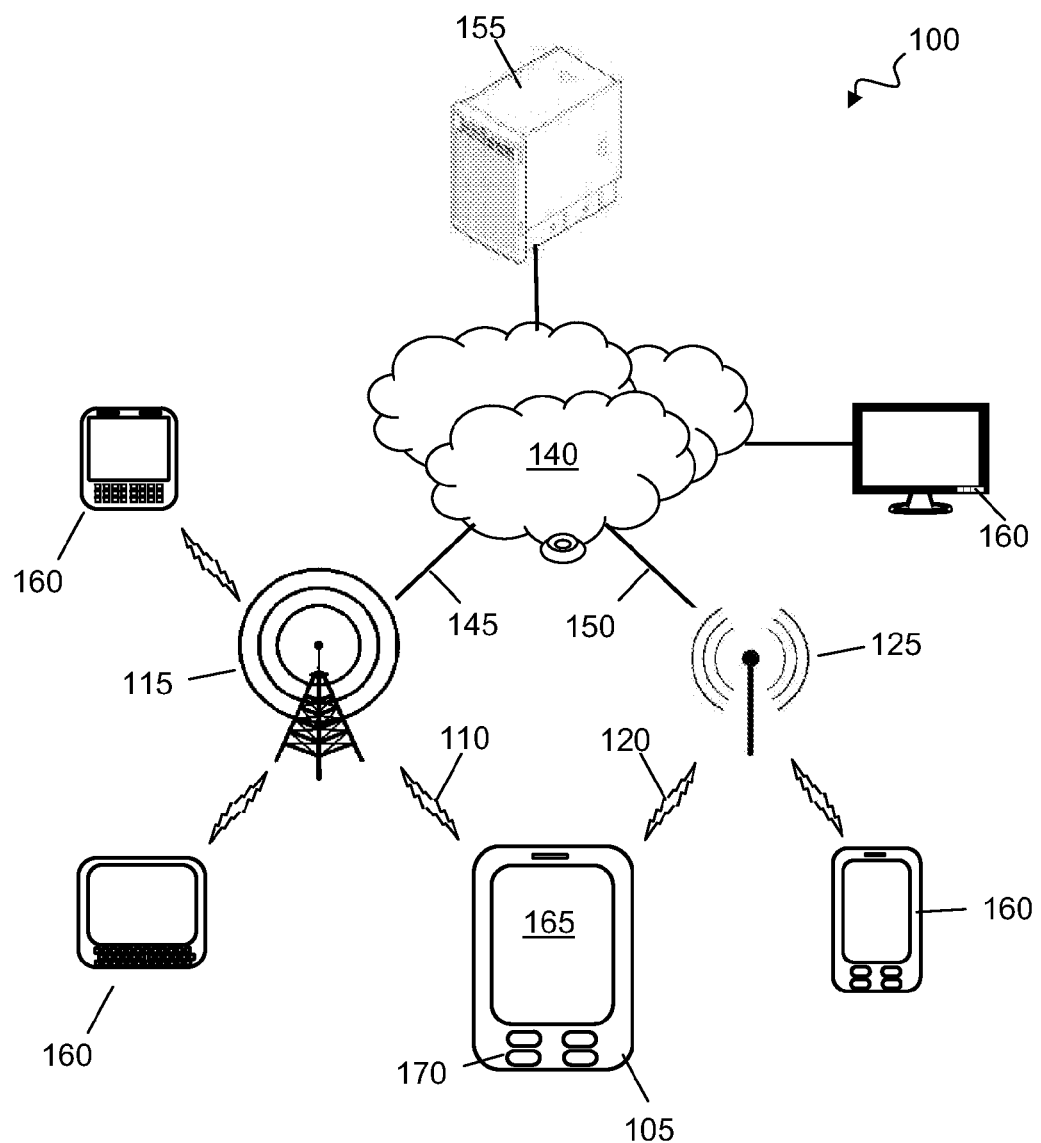
FIG. 1 is a schematic representation of a system of electronic devices that exchange information and provide social interaction.

FIG. 1 is a schematic representation of a system 100 of electronic devices that exchange information and provide social interaction. System 100 includes a handheld, mobile device 105 that is associated with a first user. Mobile device 105 is a digital data processing device that includes one or more wireless or wired data communication components. The user of mobile device 105 can use the data communication components to interact socially with other individuals using an asymmetric social network, as described further below.

In the illustrated implementation of system 100, mobile device 105 includes two wireless data communication components, namely, a mobile phone transceiver and a WiFi transceiver. The mobile phone transceiver is able to exchange messages 110 with a phone base station 115. The WiFi transceiver is able to exchange messages 120 with a WiFi access point 125.

Phone base station 115 and WiFi access point 125 are connected for data communication with one or more data communication networks 140 via data links 145, 150 and can exchange information with a server 155. Mobile device 105 and server 155 can thus exchange information relevant to the social interaction over an asymmetric social network. For example, server 155 can receive information characterizing the contents of a post that the first user wishes to transmit via an asymmetric social network. Server 155 will generally also be able to transmit such a post to the first user's followers on the asymmetric social network, as described further below.

One or more additional digital data processing devices 160, which are associated with one or more other users, are also connected for data communication with data communication networks 140 and can exchange information with a server 155. Data processing devices 160 can be connected to data communication networks 140 by wired or wireless data links, as the case may be. Data processing devices 160 and server 155 can thus also exchange information relevant to the social interaction over the asymmetric social network, as described further below. Data processing devices 160 can be, e.g., mobile, handheld data processing devices or larger data processing devices, such desktop or laptop computers.

Server 155 is a collection of one or more digital data processing devices that perform data processing activities in accordance with the logic of machine-readable instructions. Among the data processing activities performed by server 155 are activities that implement an asymmetric social network. In some implementations, in addition to asymmetric social network activities, server 155 can perform data processing activities that implement other activities. For example, server 155 can perform data processing activities that implement one or more of a search engine that searches a collection of electronic documents available on the Internet, an electronic mail or text message server, a photosharing network, a symmetric social network, and other platforms that support interaction between users. As a consequence of such additional data processing activities, server 155 can have access to data that would not otherwise be available to a stand-alone asymmetric social network. For example, server 155 may have access to, e.g., an index of the content of electronic documents available on the Internet, screenshots of some portion of those documents, electronic mail data, identification tags on photos on a photosharing network, and the like.

In addition to one or more wireless or wired data communication components, mobile device 105 can also include a display screen 165 and one or more input devices 170. In some implementations, display screen 165 can act as both an input and an output. For example, display screen 165 can be a touch screen that both displays graphical elements on a screen and detects the presence and location of interaction with the screen. Input devices 170 can include one or more, e.g., key, pad, trackball, or other component that receives mechanical, audio, or other input from a user. In some implementations, mobile device 105 can include additional components such as a GPS unit, accelerometers, a digital camera, audio jacks, and the like.

Figure 2:
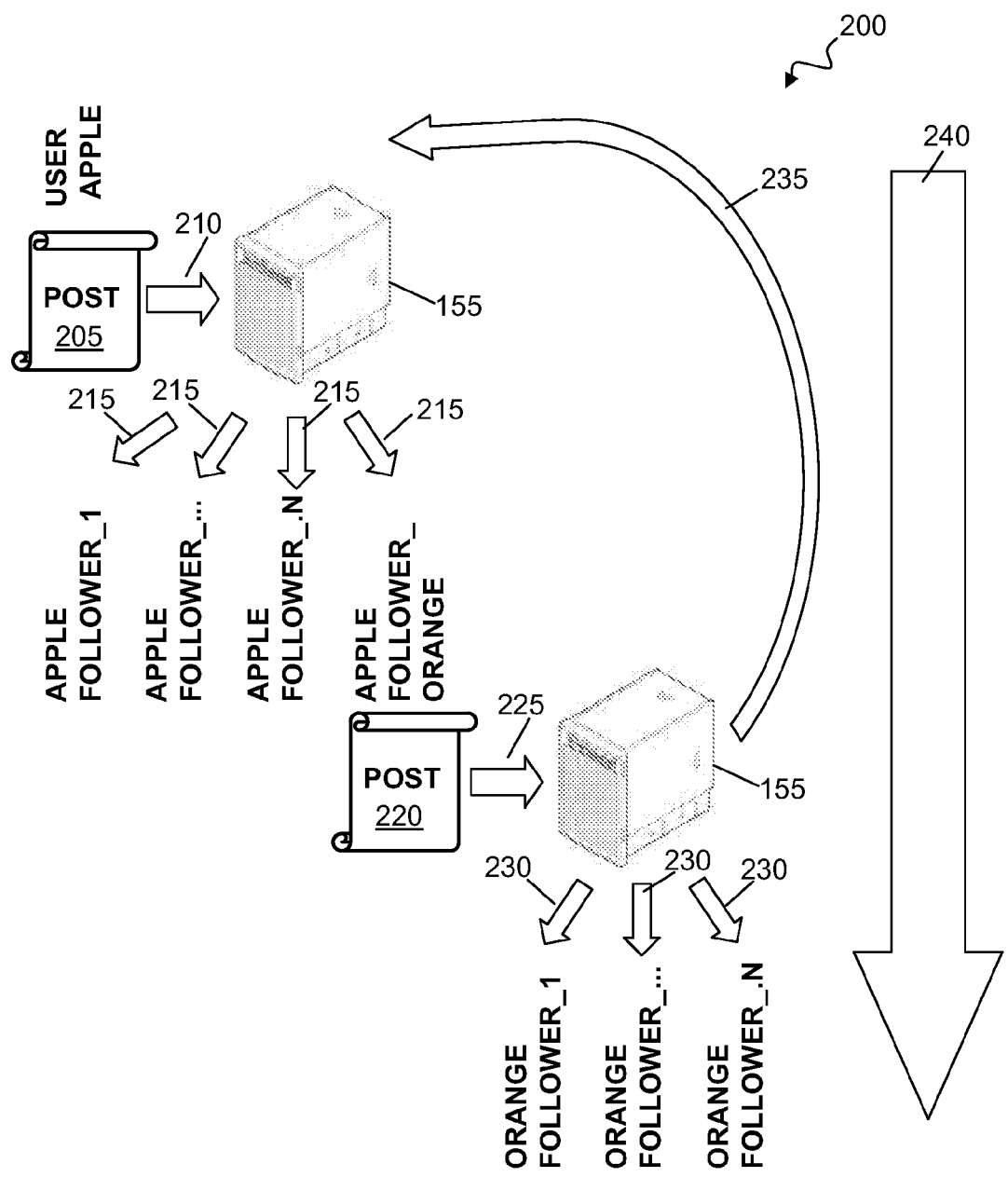
FIG. 2 is a schematic representation of an implementation of a collection of activities in an asymmetric social network.

FIG. 2 is a schematic representation of an implementation of a collection of activities 200 in an asymmetric social network. Activities 200 occur in the context of a single level asymmetric social network in which a first member can become a follower of a second member without the second member necessarily becoming a follower of the first member. In the illustrated implementation, a first user "Apple" authors a post 205 using a data processing device (e.g., mobile device 105 or data processing devices 160 (FIG. 1)). The data processing device can also receive input from the first user that triggers "posting" of post 205. Post 205 is accordingly transmitted at 210 to asymmetric social network server 155, which receives the transmission, identifies the transmission as a posting by the first user, and identifies members who are related to the first member as followers in the network. Social network server 155 then relays content from post 205 to those followers at 215. These followers can receive and review the transmitted content at one or more data processing devices (e.g., devices 160 (FIG. 1)).

One of the followers, namely, second user "Orange," may chose to reply to the content from post 205 and author a reply post 220 using a data processing device (e.g., one of devices 160 (FIG. 1)). This data processing device can also receive input from the second user that triggers posting of reply post 220. Reply post 220 is accordingly transmitted at 225 to asymmetric social network server 155, which receives the transmission, identifies the transmission as a reply posting by the second user, and identifies members who are related to the second member as followers in the network. Social network server 155 also identifies the author of the post that is being replied to, namely, first user "Apple." Social network server 155 then relays content from reply post 220 to both the followers of second user "Orange" at 230 and to the author of post 205 at 235. The followers of second user "Orange" can receive and review the transmitted content from reply post 220 at one or more data processing devices (e.g., devices 160 (FIG. 1)). The author of post 205 (i.e., first user "Apple") can receive and review the transmitted content from reply post 220 at one or more data processing devices (e.g., mobile device 105 (FIG. 1)).

As a consequence of the asymmetry in the relationships between members, there is a directionality to the flow of posts in the illustrated asymmetric social network. In particular, posts tends to preferentially flow in the direction indicated by arrow 240, i.e., from an author to that author's followers. In the illustrated example, there is an exception to this directionality, namely, the transmission of content from reply post 220 to the author of post 205 at 235. Nevertheless, the preferred directionality is in the direction indicated by arrow 240.

Figure 3:
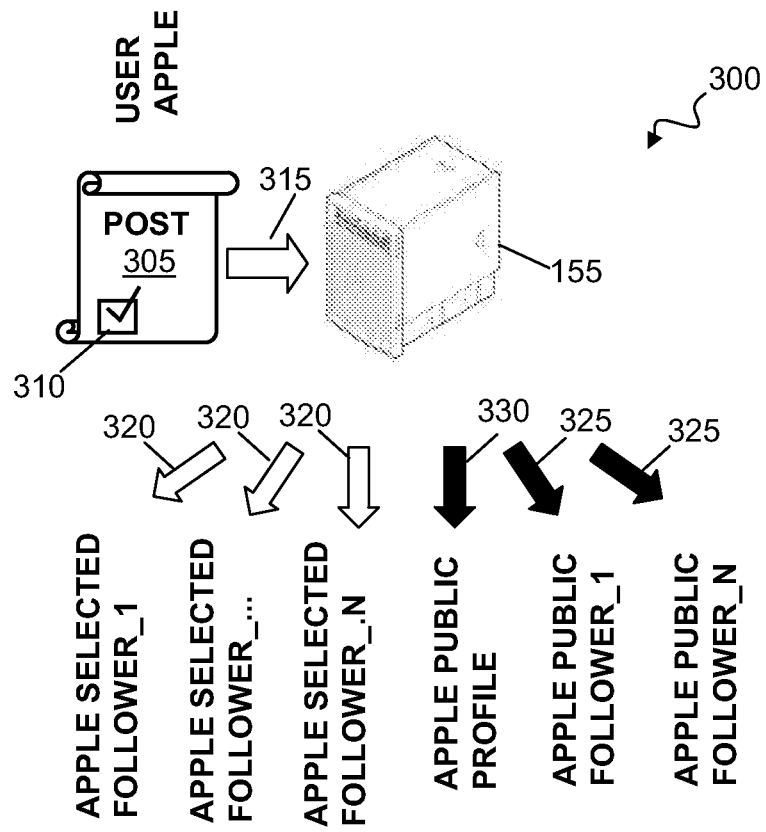
FIG. 3 is a schematic representation of an implementation of a collection of activities in an asymmetric social network

FIG. 3 is a schematic representation of an implementation of a collection of activities 300 in an asymmetric social network. Activities 300 occur in the context of a multiple level asymmetric social network in which a first member can become either a "public follower" or a "selected follower" of a second member without the second member necessarily becoming a follower of the first member. A public follower is a member of the asymmetric social network who receives a proper subset of the posts (i.e., the public posts) authored by the followed member. A selected follower is a member of the asymmetric social network who generally receives all of the posts (i.e., both public and private posts) authored by the followed member. In some implementations, a selected follower relationship between two members is established by an invitation/response protocol that effectively requires the consent of both members to the selected follower relationship.

In the illustrated implementation, first user "Apple" authors a post 305 using a data processing device (e.g., mobile device 105 or data processing devices 160 (FIG. 1)). In the course of authoring post 305, first user "Apple" indicates whether post 305 is a public or a private post, e.g., by interacting with an interactive element such as posting selection widget 835 (FIG. 8) described below. Post 305 includes information characterizing the indication.

In response to input from the first user that triggers the posting of post 305, post 305 is accordingly transmitted at 315 to asymmetric social network server 155, which receives the transmission, identifies the transmission as a posting by the first user, and determines whether post 305 is to be posted publicly or privately. In response to determining that post 305 is to be posted publicly, server 155 identifies both public and selected followers of first user "Apple" and relays content from post 305 to those followers at 320 and at 325. Server 155 also relays content from a post 305 that is to be posted publicly to the public profile of first user "Apple" at 330. A profile is a representation of an individual or a group of individuals on a member network. A profile generally includes details such as a name, a hometown, interests, pictures, and other information characterizing an individual or a group of individuals. A profile is public if other network members (or even the general public) do not require the consent of the represented individual or group in order to access the profile.

In response to determining that post 305 is to be posted privately, server 155 identifies selected followers of first user "Apple" and relays content from post 305 to those followers at 320. Private posts 305 are not relayed to public followers of first user "Apple" or to the public profile of first user "Apple." In either case, the followers to whom post 305 is relayed can receive and review the transmitted content at one or more data processing devices (e.g., devices 160 (FIG. 1)).

Activities 300 can also be used in posting a reply post (not shown). In particular, the author of a reply post can indicate whether a reply post is to be publicly or privately posted. In some implementations, a reply to a private post may be forbidden or delete information identifying the author of the replied-to post.

Figure 4:
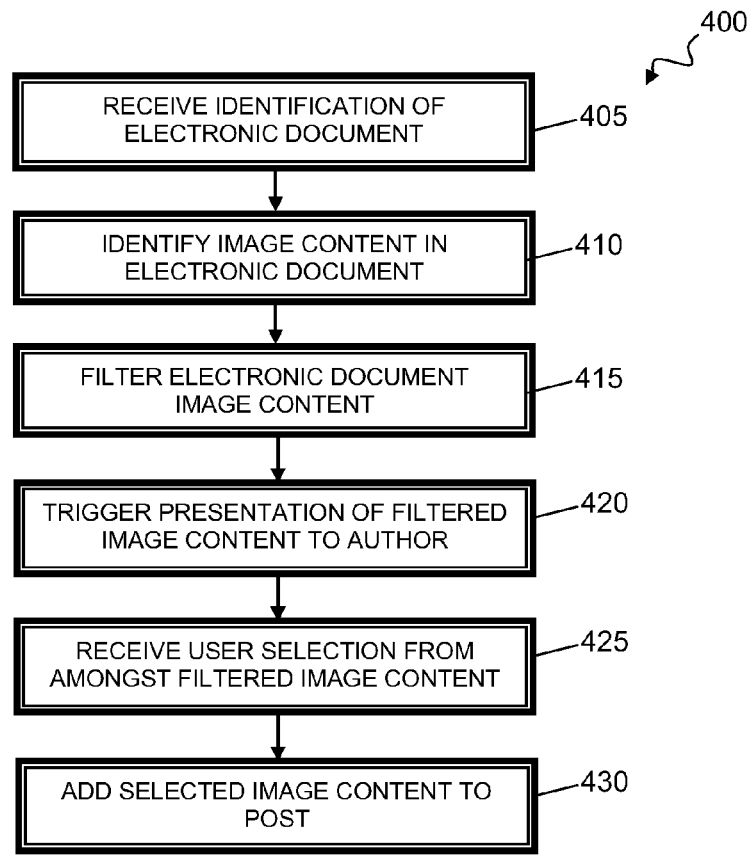
FIGS. 4, 5, 6, are flow charts of processes for assisting the authoring of posts to an asymmetric social network.
Figure 6:
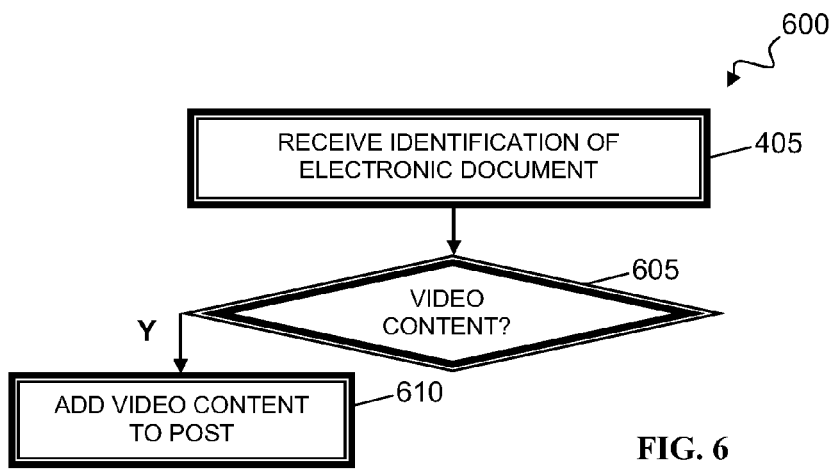
Figure 5:
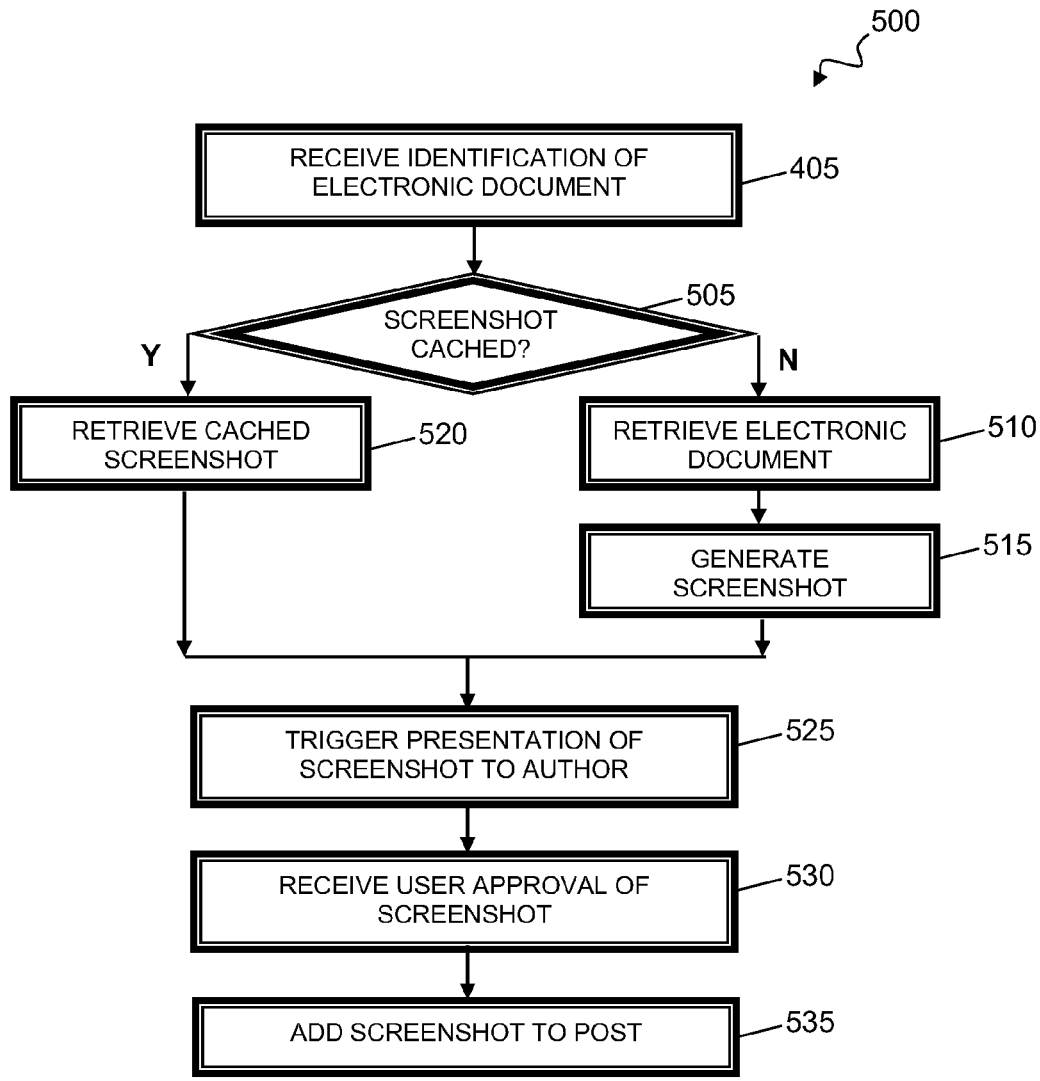

FIG. 4 is a flow chart of a process 400 for assisting the authoring of posts to an asymmetric social network. Process 400 can be performed by a server that includes one or more data processing devices that perform operations by executing one or more sets of machine-readable instructions to implement an asymmetric social network. The implementation of an asymmetric social network includes the exchange of information with a data processing device used to author a post. For example, in the context of system 100, process 400 can be performed by server 155 that exchanges information with mobile device 105 or a data processing device 160 (FIG. 1). Process 400 can be performed in isolation or in conjunction with other digital data processing operations. For example, in some implementations, process 400 can be performed in conjunction with one or more of processes 500, 600 (FIGS. 5, 6).

The device performing process 400 receives an identification of an electronic document at block 405. An electronic document is a collection of machine-readable data. Electronic documents are generally individual files that are formatted in accordance with a defined format (e.g., HTML, MS Word, or the like). Electronic documents can be electronically stored and disseminated. In some cases, electronic documents include media content such as images, audio content, and video content, as well as text and links to other electronic documents. Electronic documents need not be individual files. Instead, an electronic document can be stored in a portion of a file that holds other documents or in multiple coordinated files.

An electronic document can be identified in a number of ways. For example, the received identification can include a uniform resource identifier (URI) such as a uniform resource name (URN) or a uniform resource locator (URL). The identified electronic document can be, e.g., available on the Internet, available on another network, or locally available to the device performing process 400.

The identification of the electronic document can be received in one or more messages received from an electronic device that is being used to author a posting to an asymmetric social network. For example, in the context of system 100, the identification of the electronic document can be received by server 155 from mobile device 105 or from a data processing device 160 (FIG. 1).

The device performing process 400 identifies image content in the electronic document at block 410. An image is a pictorial representation. Examples of images include photos, icons, and other pictorial elements. Images can be identified, e.g., by identifying image tags in mark-up language documents (e.g., <img> tags in HTML).

The device performing process 400 can identify image content from information that describes the electronic document or from the identified electronic document itself. For example, in some instances, device performing process 400 can retrieve the identified electronic document from the Internet and scrape image content from the retrieved document. In some instances, the actual electronic document need not be retrieved but rather image content can be identified, e.g., from a cache of images previously drawn from the identified electronic document.

The device performing process 400 filters the image content of the electronic document at block 415. Filtering the image content separates image content of the electronic document that is undesirable for inclusion in a post to an asymmetric social network from image content that is potentially desirable—per the taste of the author—for inclusion in such a post.

For example, in some implementations, advertisements in an electronic document can be separated from other image content of the document that is potentially desirable for inclusion in a post to an asymmetric social network. Advertisements are promotions of a product or service and can appear in electronic documents available on the Internet. Advertisements can be distinguished from other image content using a variety of different techniques. For example, advertisements can be distinguished based on their aspect ratio. For example, if image content has an aspect ratio that is equal to or greater than 3:1, the image content can be categorized as an advertisement (e.g., either a banner or a skyscraper ad). As another example, advertisements can be distinguished based on a source address from which the advertisement originates. For example, many advertisements (e.g., GOOGLE image ads that come from ADSENSE) have a URL that follows a distinguishable pattern. The pattern can identify that the advertisements are served from an identifiable set of machines, from an identifiable domain name system, or the like. By identifying that an image or other content originates from such a source address, an advertisement can be identified.

As another example of filtering, in some implementations, icons of an electronic document can be separated from other image content of the document that is potentially desirable for inclusion in a post to an asymmetric social network. An icon is a pictorial element in a graphical user interface that represents an item or an activity. For example, icons can represent a file, a directory, an action, or the like. In general, icons are interactive elements that can receive user input and trigger designated data processing activities in response. For example, an icon representing a directory may trigger navigation to that directory in response to a user clicking on the icon.

Icons can be distinguished from other image content using a variety of different techniques. For example, icons can be distinguished based on their size. For example, if image content is smaller than 30 pixels on any side, the image content can be categorized as an icon. As another example, CSS sprites can be identified as icons. CSS sprites have a distinguishable pattern that can be used to determine whether an image is an icon or not.

As another example of filtering, in some implementations, decorative elements of an electronic document can be separated from other image content of the document that is potentially desirable for inclusion in a post to an asymmetric social network. Examples of decorative elements include scrollwork, illuminated first letters, rounded corners, and drop-shadows.

Decorative elements can be distinguished from other image content using a variety of different techniques. For example, decorative elements can be distinguished based on their size. For example, if image content is smaller than 30 pixels on any side, the image content can be categorized as a decorative element.

The device performing process 400 triggers the presentation of the filtered image content (i.e., the image content that is potentially desirable for inclusion in a post to an asymmetric social network) to the author at block 420. In the context of system 100, server 155 can trigger the presentation of the filtered image content to the author by mobile device 105 or other data processing device 160.

Image content can be presented in a number of different ways. For example, in some implementations, the image content can be presented as thumbnail images that are generated at the device performing process 400 and transmitted to the data processing device being used by the author of a post. In other implementations, the image content can be presented as thumbnails which are generated by the data processing device being used by the author. An example of a user interface that presents filtered image content in response to such a trigger is described below. Each of the thumbnail or other images that are transmitted to the data processing device can be associated with a respective ID number or other identifier that identifies the image.

The device performing process 400 receives a user selection from amongst the filtered image content at block 425. The user selection identifies which, if any, of the image content that is potentially desirable for inclusion in a post to an asymmetric social network is in fact to be included in a particular post. The user selection is generally initially received as a consequence of user interaction with one or more input devices of the device that presents the filtered image content to the author. The device which presents the filtered image content relays information characterizing the selection to the device performing process 400, along with, e.g., text content of the posting. For example, in the context of system 100, user interaction with input devices 170 makes a selection. Information characterizing the selected image content is transmitted along with the text of a post from mobile device 105 or other data processing device 160 to server 155 (FIG. 1). In some implementations, the selected image content can be characterized in the transmission using the same ID number or identifier used to trigger presentation of the image content at block 420.

The device performing process 400 adds the selected user content to a post on the asymmetric social network at block 430. The selected user content can be added in response to the device receiving instructions that the post be posted. The selected image content can be integrated into the post and relayed to the followers of the author (e.g., at either or both of 215, 230 in asymmetric social network activities 200 (FIG. 2)).

The addition of selected image content to such a post assists the author. In particular, an author can author posts with image content more easily. Further, by filtering image content before the image content is presented to an author, an author can select desirable image content without having to review large amounts of image content.

FIG. 5 is a flow chart of a process 500 for assisting the authoring of posts to an asymmetric social network. Process 500 can be performed by a server that includes one or more data processing devices that perform operations by executing one or more sets of machine-readable instructions to implement an asymmetric social network. The implementation of an asymmetric social network includes the exchange of information with a data processing device used to author a post that is to be posted on the asymmetric social network. For example, in the context of system 100, process 500 can be performed by server 155 that exchanges information with mobile device 105 or a data processing device 160 (FIG. 1). Process 500 can be performed in isolation or in conjunction with other digital data processing operations. For example, in some implementations, process 500 can be performed in conjunction with one or more of processes 400, 600 (FIGS. 4, 6).

The device performing process 500 receives an identification of an electronic document at block 405. The electronic document can be identified, e.g., by a uniform resource identifier (URI) and the identified electronic document can be, e.g., available on the Internet. In the context of system 100, the identification of the electronic document can be received by server 155 from mobile device 105 or from a data processing device 160 (FIG. 1).

The device performing process 500 determines whether a screenshot of the identified document has been cached at decision 505. For example, in some implementations, the screenshot of the identified document will be cached for use by an Internet browser, such as the thumbnail screenshots of electronic documents on the Internet available to the GOOGLE CHROME browser.

In response to determining that a screenshot of the identified document has not been cached, the device performing process 500 retrieves the identified electronic document at block 510 and generates a screenshot thereof at block 515. If the electronic document is available on the Internet, the device performing process 500 can render the electronic document using a server-side Webkit renderer and generate a screenshot from the rendition.

In response to determining that a screenshot of the identified document has been cached, the device performing process 500 retrieves the cached screenshot at block 520.

In either case, the device performing process 500 also triggers the presentation of the screenshot to the author at block 525. In the context of system 100, server 155 can trigger the presentation of the filtered image content to an author by mobile device 105 or other data processing device 160. The presentation can be triggered in a number of different ways. For example, in some implementations, the device can form a thumbnail image of the screenshot and transmit the thumbnail image to a data processing device being used by the author of a post, along with instructions indicating that the screenshot is to be displayed. In other implementations, the screenshot content itself can be transmitted to the data processing device being used by the author. An example of a user interface that presents a thumbnail image of a screenshot in response to such a trigger is described below.

The device performing process 500 receives an author's approval of the screenshot at block 530. The approval indicates that the screenshot is to be included in a particular post to an asymmetric social network. The approval is generally initially received by one or more input devices of the device that presents the screenshot to the author and then relayed to the device performing process 500 along with other content of the posting. For example, in the context of system 100, an author interacts with input devices 170 to approve the screenshot for inclusion and the approval relayed in a posting transmitted from mobile device 105 or other data processing device 160 to server 155 (FIG. 1).

The device performing process 500 adds the approved screenshot to a post on the asymmetric social network at block 535. The approved screenshot can be added in response to the device performing process 500 receiving information characterizing the text and any other content of the post (including approval of the screenshot), along with instructions that the post be posted. The approved screenshot can be integrated into the post and relayed to the followers of the author (e.g., at either or both of 215, 230 in asymmetric social network activities 200 (FIG. 2)).

The addition of a screenshot to such a post assists the author. In particular, an author can author posts that include a screenshot more easily. Further, by allowing a user to approve the inclusion of a screenshot in the post, the post can be tailored to the author's wishes.

FIG. 6 is a flow chart of a process 600 for assisting the authoring of posts to an asymmetric social network. Process 600 can be performed by a server that includes one or more data processing devices that perform operations by executing one or more sets of machine-readable instructions to implement an asymmetric social network. The implementation of an asymmetric social network includes the exchange of information with a data processing device used to author a post that is to be posted on the asymmetric social network. For example, in the context of system 100, process 600 can be performed by server 155 that exchanges information with mobile device 105 or a data processing device 160 of the author (FIG. 1). Process 600 can be performed in isolation or in conjunction with other digital data processing operations. For example, in some implementations, process 600 can be performed in conjunction with one or more of processes 400, 500 (FIGS. 4, 5).

The device performing process 600 receives an identification of an electronic document at block 405. The electronic document can be identified, e.g., by a uniform resource identifier (URI) and the identified electronic document can be, e.g., available on the Internet. In the context of system 100, the identification of the electronic document can be received by server 155 from mobile device 105 or from a data processing device 160 (FIG. 1).

The device performing process 600 determines whether the identified electronic document includes animation or other video content at decision 605. Video content results in a sequence of visual images that represent a scene in motion when presented on a display device. The scene can be real or imagined.

The device performing process 600 can identify video content from information that describes the electronic document or from the identified electronic document itself. For example, in some instances, the device can retrieve an electronic document that is available on the Internet and identify video content in the retrieved document. In other instances, the actual electronic document need not be retrieved but rather video content can be identified from information describing the electronic document. Video content can be identified from an electronic document, e.g., by examining object types in mark-up language documents.

In response to determining that the identified electronic document includes video content, the device performing process 600 adds the video content to a post on the asymmetric social network at block 610. Adding the video content to the post can include the device performing process 600 forming or retrieving a thumbnail image of frame in the video content and transmitting the thumbnail image to a data processing device being used by the author of a post. In other implementations, a frame or the video content itself can be transmitted to a data processing device being used by the author. An example of a user interface that indicates that the video content is to be added to a post is described below.

The video content can be added in response to the device performing process 600 receiving instructions that the post be posted. The video content can be added to the post and relayed to the followers of the author (e.g., at either or both of 215, 230 in asymmetric social network activities 200 (FIG. 2)).

Figure 7:
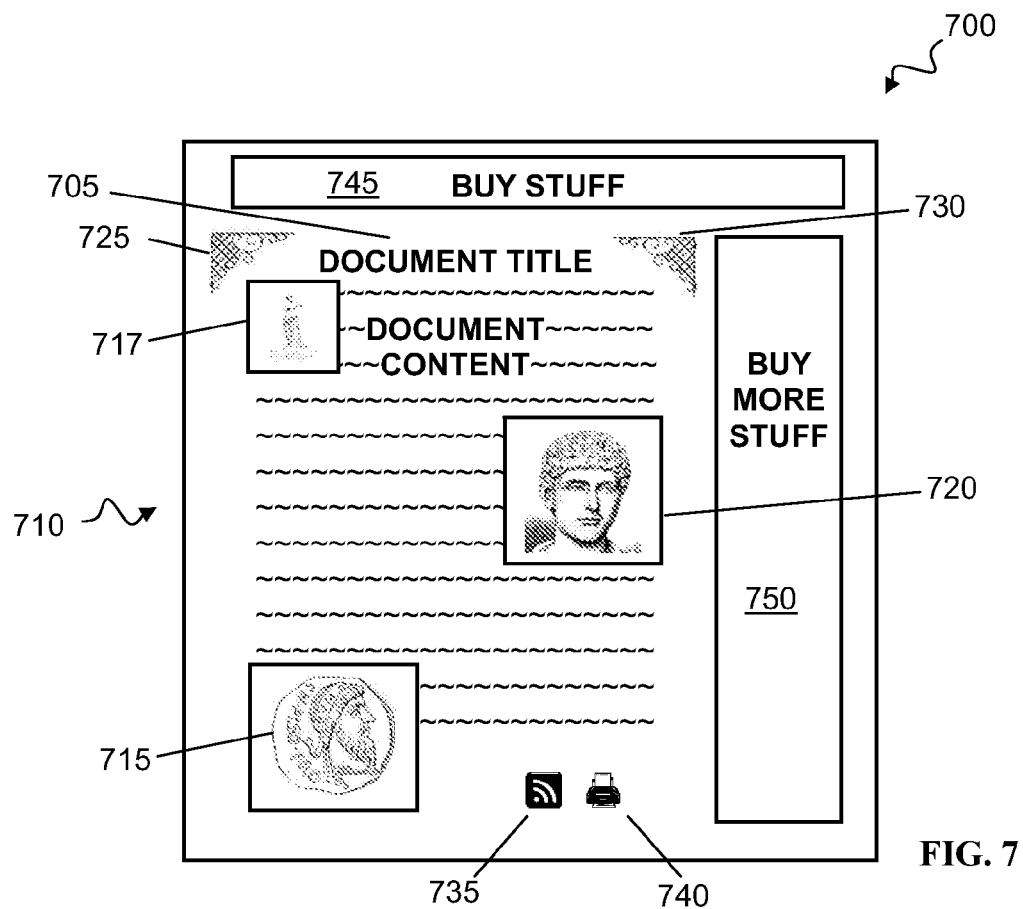
FIG. 7 is a schematic representation of an electronic document that can be identified to a server by an author of a post to an asymmetric social network.

FIG. 7 is a schematic representation of an electronic document 700 that can be identified to a server by an author of a post to an asymmetric social network. For example, electronic document 700 can be electronic document that is available on the Internet, such as an HTML format document.

Electronic document 700 includes a document title 705, a text body 710, images 715, 717, 720, decorative elements 725, 730, icons 735, 740, a banner advertisement 745, and a skyscraper advertisement 750. Document title 705 is a textual or other heading that describes the body of content of electronic document 700. Text body 710 is written matter in the body of content of electronic document 700. Images 715, 717, 720 are pictorial representations that are part of the body of content of electronic document 700. Decorative elements 725, 730 are pictorial elements that adorn the body of content of electronic document 700. Icons 735, 740 are pictorial elements that, in the illustrated implementation, are interactive elements that can receive user input and trigger designated data processing activities in response. In particular, icon 735 triggers activities related to a subscription to an RSS feed. Icon 735 triggers activities related to printing electronic document 700. Banner advertisement 745 and skyscraper advertisement 750 are pictorial elements that promote products or services.

Figure 8:
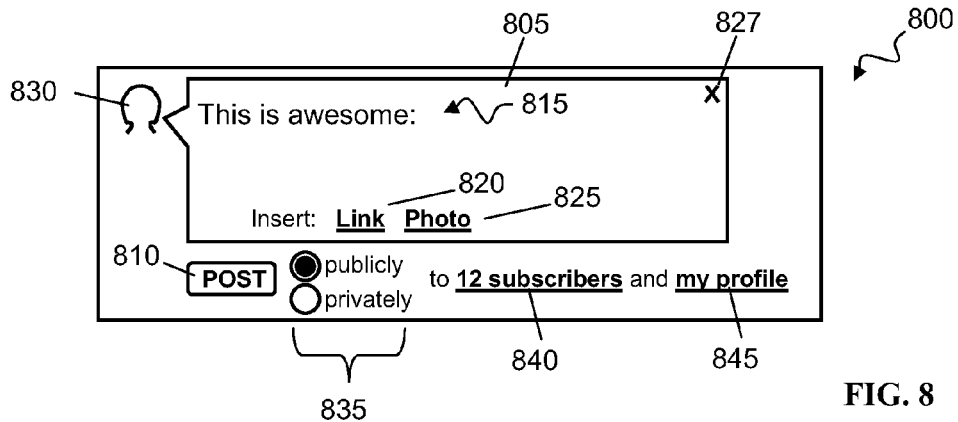
FIG. 8 is a schematic representation of a user interface that assists in the authoring of posts to an asymmetric social network.

FIG. 8 is a schematic representation of a user interface 800 that assists in the authoring of posts to an asymmetric social network. In the illustrated implementation, user interface 800 is a graphical presentation that can be displayed to an author at a data processing device used by the author of such a post. For example, in the context of system 100, user interface 800 can be displayed to an author at mobile device 105 or other data processing device 160 that can exchange data with server 155 and assist with the authoring of posts to an asymmetric social network (FIG. 1).

User interface 800 includes a text entry box 805 and a posting trigger 810. Text entry box 805 is an interactive element that is programmed to receive text that is to be included in a post from the author. For example, in the illustrated implementation, text entry box 805 has received text 815 (i.e., "This is awesome:") from the author.

In the illustrated implementation, text entry box 805 encompasses a trio of widgets 820, 825, 827. Interactive widgets are textual or other display elements that trigger determined data processing activities in response to user interaction. For example, in the illustrated implementation, widget 820 is an interactive display element that triggers the display of a link entry field that is programmed to receive the URL of an electronic document that is available on the Internet in response to user interaction.

Widget 825 is an interactive display element that triggers the display of a text entry field that is programmed to receive an identifier of an image that is to be included in the post. In some implementations, the text entry field triggered by widget 825 can interact with the author to navigate through data stored locally on the data processing device that displays user interface 800 and to receive the author's selection an image that is to be included in the post. In some implementations, the text entry field triggered by widget 825 can interact with the author to allow the author to conduct a search of an electronic document collection to identify and select an image that is to be included in the post. For example, the text entry field triggered by widget 825 can receive a search query that is transmitted to a server that performs data processing activities that implement a search engine. The search engine can conduct a search for images that are responsive to the search query and return thumbnails of the images for presentation on user interface 800. User interface 800 can receive one or more selections from amongst the presented images for inclusion in the post. Data characterizing the selected image content can be transmitted from the device which displays user interface 800 to server 155 so that the selected image content can be included in the post to the asymmetric member network.

Widget 827 is an interactive display element that, in response to user interaction, triggers the closing of text entry box 805 and deletion of text 815 and any image or video content that was to have been included in the post.

Also, in the illustrated implementation, text entry box 805 is disposed adjacent to an image or other identifier 830 of the author who is authoring the post. Identifier 830 can be, e.g., a name, an image, and/or avatar drawn from a profile of the author in the asymmetric social network.

Posting trigger 810 is an interactive element that is programmed to trigger the posting of the authored post to the asymmetric social network in response to user interaction. In response to interaction with posting trigger 810, the device which displays user interface 800 transmits, to server 155 (FIG. 1), information characterizing any text presently in text entry box 805, information characterizing any image content selected by the author for inclusion in the post, information characterizing any video content to be included in the post, and information characterizing any approval by the author of a screenshot for inclusion in the post.

In the illustrated implementation, posting trigger 810 is associated with posting selection widget 835 that allows the author to select whether a post is to be publicly or privately posted. Private posting releases the post only to selected followers of the author in the asymmetric social network. Public posting releases the post both to public and selected followers of the author and to the author's profile in the asymmetric social network.

Posting selection widget 835 is itself associated with a pair of widgets 840, 845. Widget 840 is an interactive display element that is programmed to trigger the display of information characterizing the members of the asymmetric social network who follow the author in response to interaction by the author. Widget 845 is an interactive display element that is programmed to trigger the display of information characterizing the author's asymmetric social network profile in response to interaction by the author.

Figure 9:
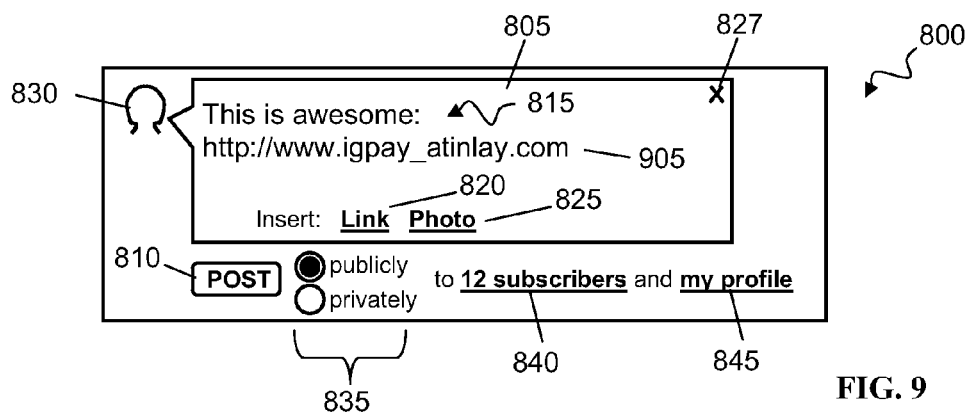
FIG. 9 is a schematic representation of the user interface of FIG. 8 after the author has entered an identifier of an electronic document into a text entry box.

FIG. 9 is a schematic representation of user interface 800 after the author has entered an identifier 905 of an electronic document into text entry box 805. In the illustrated implementation, identifier 905 is the URL of an electronic document that is available on the Internet, such as electronic document 700 (FIG. 7).

In response to entry of identifier 905 into text entry box 805, the data processing device that displays user interface 800 can relay identifier 905 to a server that assists in the authoring of posts to an asymmetric social network. For example, in the context of system 100, mobile device 105 or other data processing device 160 can transmit identifier 905 to server 155 (FIG. 1). The transmission of identifier 905 identifies the electronic document identified by identifier 905 to the server and allows the server to perform data processing activities that assist in the authoring of posts to the asymmetric social network, such as one or more of processes 400, 500, 600 (FIGS. 4, 5, 6).

Figure 10:
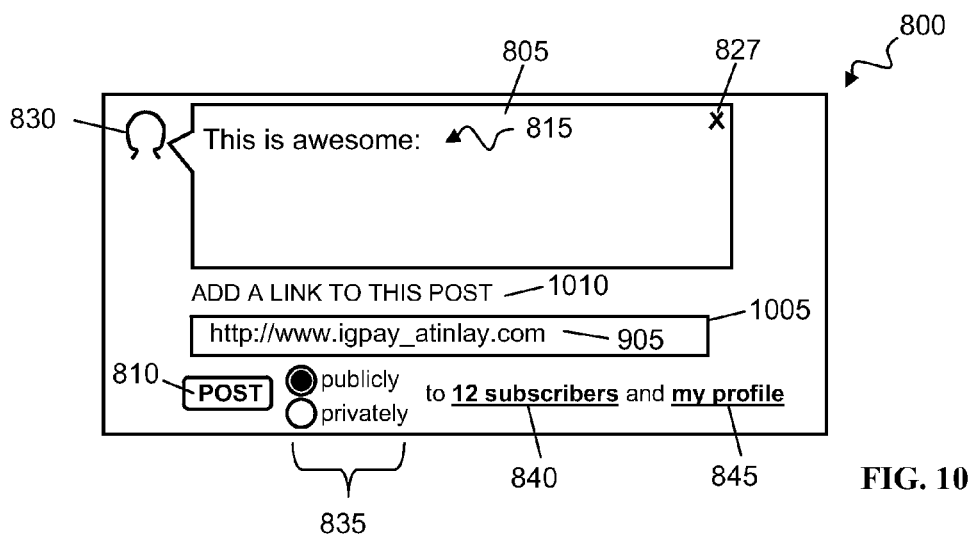
FIG. 10 is a schematic representation of the user interface of FIG. 8 after the author has interacted with widget and triggered the display of a link entry field.

FIG. 10 is a schematic representation of user interface 800 after the author has interacted with widget 820 and triggered the display of a link entry field 1005. Link entry field 1005 is an interactive display element that is programmed to receive the URL of an electronic document that is available on the Internet. In the illustrated implementation, identifier 905 has been entered into link entry field 1005 by the author and user interface 800 also includes a prompt 1010 urging the author to enter a link into link entry field 1005.

In response to entry of identifier 905 into link entry field 1005, the data processing device that displays user interface 800 can relay identifier 905 to a server that assists in the authoring of posts to an asymmetric social network. For example, in the context of system 100, mobile device 105 or other data processing device 160 can transmit identifier 905 to server 155 (FIG. 1). The transmission of identifier 905 identifies the electronic document identified by identifier 905 to the server and allows the server to perform data processing activities that assist in the authoring of posts to the asymmetric social network, such as one or more of processes 400, 500, 600 (FIGS. 4, 5, 6).

The representations of user interface 800 in FIGS. 9 and 10 thus illustrate two alternatives in which an identifier of an electronic document can be received from an author and used to assist the author in the authoring a post to an asymmetric social network.

Figure 11:
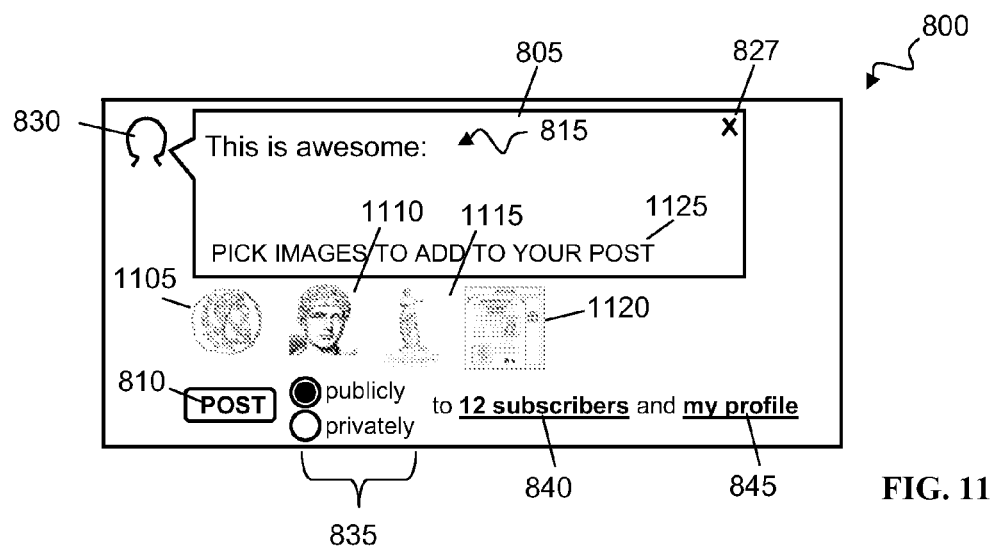
FIGS. 11-13 are schematic representations of the user interface of FIG. 8 presenting filtered image content and a screenshot to the author of a post to an asymmetric social network.

FIG. 11 is a schematic representation of user interface 800 that presents filtered image content and a screenshot to the author of a post to an asymmetric social network. User interface 800 can present filtered image content and a screenshot in response to a trigger received from server 155 (FIG. 1) in the course of performing one or both of process 400, 500 (FIGS. 4, 5) (i.e., after the server has received electronic document identifier 905 entered into link entry field 1005 (FIG. 10)).

In the illustrated implementation, user interface 800 presents filtered image content by displaying a collection of thumbnail images 1105, 1110, 1115 and a thumbnail screenshot 1120 in association with a prompt 1125. Thumbnail image 1105 is a miniature likeness of a first image in the body of the content of the electronic document identified by identifier 905, namely, image 715 of electronic document 700 (FIG. 7) in the illustrated implementation. Thumbnail image 1110 is a miniature likeness of a second image in the body of the content of the electronic document identified by identifier 905, namely, image 720 of electronic document 700 (FIG. 7) in the illustrated implementation. Thumbnail image 1115 is a miniature likeness of a third image in the body of the content of the electronic document identified by identifier 905, namely, image 717 of electronic document 700 (FIG. 7) in the illustrated implementation. Thus, multiple thumbnail images 1105, 1110, 1115 are presented to the author at the same time without image content of the electronic document identified by identifier 905 that is undesirable for inclusion in a post.

Thumbnail screenshot 1120 is a miniature likeness of a screenshot of the electronic document identified by identifier 905. Prompt 1125 is a text or other message that urges the author to select from amongst thumbnail images 1105, 1110, 1115 and to approve thumbnail screenshot 1120 for inclusion in a post.

In some instances, the body of the content of the electronic document identified by identifier 905 will include such a large number of images that miniature likenesses of all of the images cannot reasonably be presented in user interface 800. In such instances, user interface 800 can present a proper subset of the images in the body of the content of the electronic document and include an interactive navigational element (e.g., a "show more" button) that can receive user interaction triggering the presentation of other images of the electronic document. In some implementations, the images can be presented in an order that corresponds with a calculated probability that the images are desirable for inclusion in a post to an asymmetric social network. For example, images with the lowest probabilities of being advertisements, icons, or decorative elements can be presented first. Images with the highest probabilities of being advertisements, icons, or decorative elements can be presented last. Images with intermediate probabilities of being advertisements, icons, or decorative elements can be presented between the images with the lowest probabilities and images with the highest probabilities. The probabilities can be calculated by device that filters image content of the electronic document identified by identifier 905, e.g., at block 415 of process 400 (FIG. 4).

Figure 12:
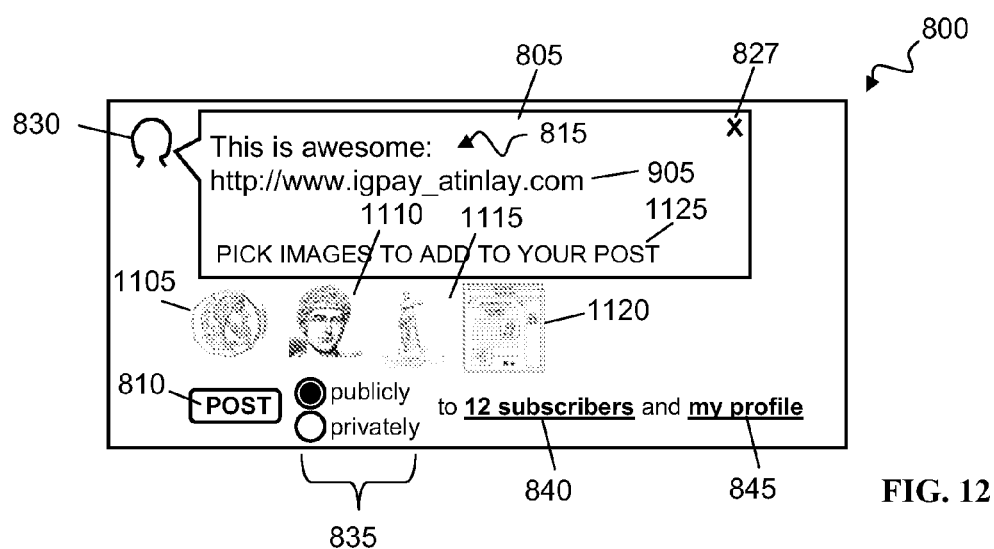

FIG. 12 is a schematic representation of user interface 800 that presents filtered image content and a screenshot to the author of a post to an asymmetric social network. User interface 800 can present filtered image content and a screenshot in response to a trigger received from server 155 (FIG. 1) in the course of performing one or both of process 400, 500 (FIGS. 4, 5) (i.e., after the server has received electronic document identifier 905 entered into text entry box 805 (FIG. 9)). In the illustrated implementation, user interface 800 presents filtered image content by displaying thumbnail images 1105, 1110, 1115 and thumbnail screenshot 1120 in association with prompt 1125.

In instances where the body of the content of the electronic document identified by identifier 905 includes such a large number of images that miniature likenesses of the images cannot reasonably be presented in user interface 800, user interface 800 can present a proper subset of the images and include an interactive navigational element. In some implementations, the images can be presented in an order that corresponds with a calculated probability that the images are desirable for inclusion in a post to an asymmetric social network, as described above.

Figure 13:
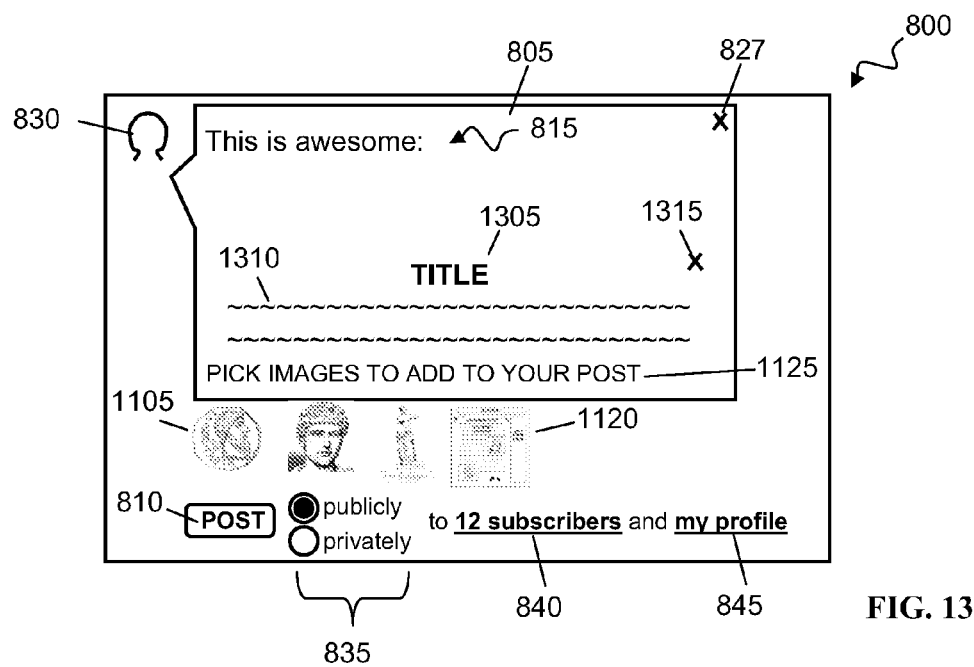

FIG. 13 is a schematic representation of user interface 800 that presents filtered image content and a screenshot to the author of a post to an asymmetric social network. User interface 800 can present filtered image content and a screenshot in response to a trigger received from server 155 (FIG. 1) in the course of performing one or both of process 400, 500 (FIGS. 4, 5) after the author has entered electronic document identifier 905 into text entry box 805 (FIG. 9) or after the author has triggered the display of a link entry field 1005 and entered identifier 905 into link entry field 1005 (FIG. 10).

In the illustrated implementation, user interface 800 presents filtered image content by displaying thumbnail images 1105, 1110, 1115, presents thumbnail screenshot 1120 in association with prompt 1125, and presents the author with a title 1305 and an excerpt 1310 of the body of written matter of the electronic document identified by identifier 905. Title 1305 can be drawn, e.g., from a title metatag or from document title 705 of electronic document 700 (FIG. 7). Excerpt 1310 can be drawn from, e.g., a description metatage or from text body 710 of electronic document 700 (FIG. 7). User interface 800 also includes a widget 1315 that is associated with title 1305 and excerpt 1310, e.g., by virtue of adjacent disposition on user interface 800. Widget 1315 is an interactive display element that triggers deletion of title 1305 and excerpt 1310 both from text entry box 805 and from the post to an asymmetric social network in response to user interaction.

In instances where the body of the content of the electronic document identified by identifier 905 includes such a large number of images that miniature likenesses of the images cannot reasonably be presented in user interface 800, user interface 800 can present a proper subset of the images and include an interactive navigational element. In some implementations, the images can be presented in an order that corresponds with a calculated probability that the images are desirable for inclusion in a post to an asymmetric social network, as described above.

Figure 14:
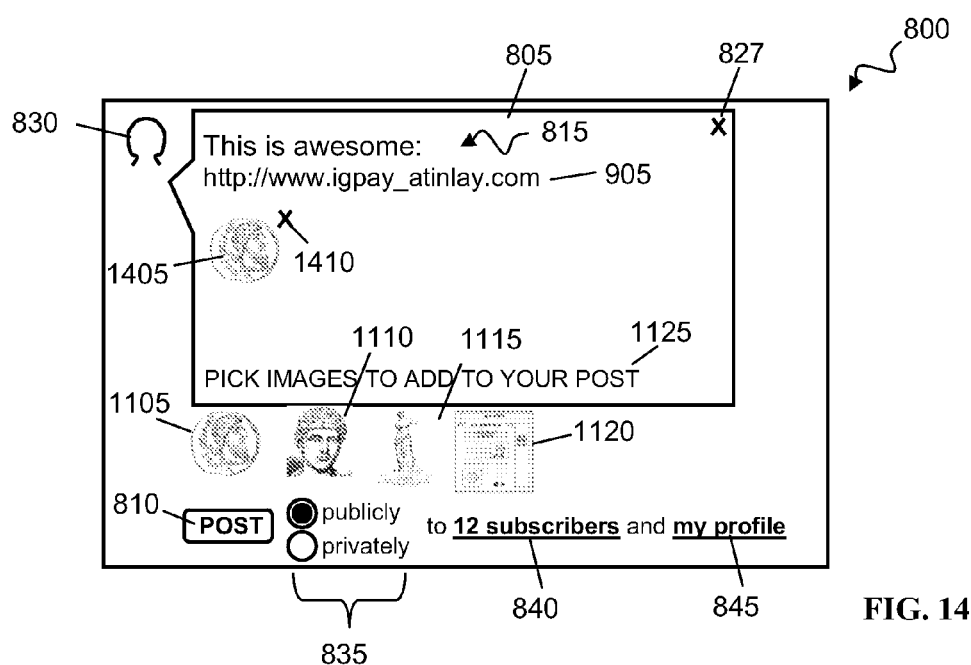
FIG. 14 is a schematic representation of the user interface of FIG. 8 after receipt of an author's selection of an image for inclusion in a post to an asymmetric social network from amongst the filtered image content that has been presented.

FIG. 14 is a schematic representation of user interface 800 after receipt of an author's selection of an image for inclusion in a post to an asymmetric social network from amongst the filtered image content that has been presented. Information characterizing the author's selection of an image for inclusion can be relayed from the data processing device that displays user interface 800 to a server that assists in the authoring of posts to an asymmetric social network. For example, in the context of system 100, mobile device 105 or other data processing device 160 can transmit an identifier of image 715 to server 155 (FIG. 1) for use in process 400 (FIG. 4).

In the illustrated implementation, user interface 800 has received the author's selection of image 1105 for inclusion in a post and includes an identifier 1405 of the selected image in text entry box 805. The author's selection can be received, e.g., as user interaction with image 1105. Identifier 1405 can be, e.g., a reproduction or other likeness of image 1105 (as shown) or text that identifies image 1105. User interface 800 also includes a widget 1410 that is associated with identifier 1405, e.g., by virtue of adjacent disposition on user interface 800. Widget 1410 is an interactive display element that, in response to user interaction, ends the selection of image 1105 for inclusion in the post to the asymmetric social network and triggers the removal of identifier 1405 from text entry box 805.

The illustrated implementation of user interface 800 includes electronic document identifier 905 in text entry box 805. In instances where the author has triggered the display of link entry field 1005 and entered identifier 905 into link entry field 1005 (FIG. 10), text entry box 805 does not include identifier 905.

Figure 15:
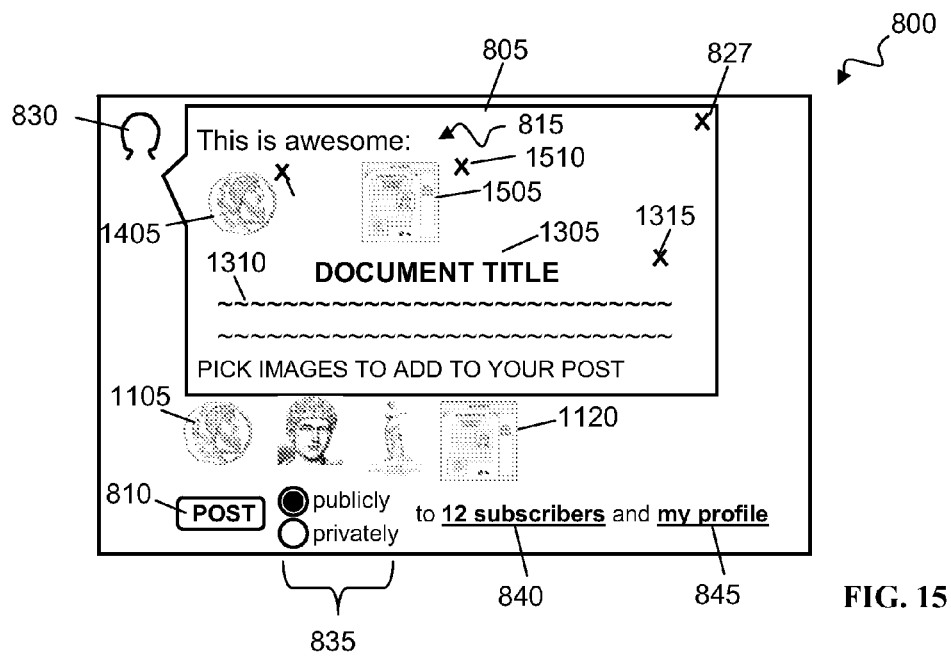
FIG. 15 is a schematic representation of the user interface of FIG. 8 after receipt of both an author's selection of an image and approval of a screenshot for inclusion in a post to an asymmetric social network.

FIG. 15 is a schematic representation of user interface 800 after receipt of both an author's selection of an image and approval of a screenshot for inclusion in a post to an asymmetric social network. The author's selection and approval for inclusion can be relayed from the data processing device that displays user interface 800 to a server that assists in the authoring of posts to an asymmetric social network. For example, in the context of system 100, mobile device 105 or other data processing device 160 can transmit an identifier of image 715 and an indication of the author's approval of inclusion of a screenshot in the post to server 155 (FIG. 1) for use in one or both of processes 400, 500 (FIGS. 4, 5).

In the illustrated implementation, user interface 800 has received the author's selection of image 1105 and approval of inclusion of a screenshot in a post. In addition to identifier 1405, text entry box 805 also includes an indicator 1505 of the approval of the inclusion of a screenshot. The author's approval of inclusion of a screenshot can be received, e.g., as user interaction with screenshot 1120. Indicator 1505 can be, e.g., a reproduction or other likeness of screenshot 1120 (as shown) or text that indicates that screenshot 1120 has been approved for inclusion. User interface 800 also includes a widget 1510 that is associated with indicator 1505, e.g., by virtue of adjacent disposition on user interface 800. Widget 1510 is an interactive display element that triggers, in response to user interaction, an end to the approval of the inclusion of screenshot 1120 in a post to the asymmetric social network and the removal of indicator 1505 from text entry box 805.

The illustrated implementation of user interface 800 does not include electronic document identifier 905 in text entry box 805. In instances where the author has entered identifier 905 into text entry box 805 (FIG. 9), text entry box 805 can still include identifier 905.

Figure 16:
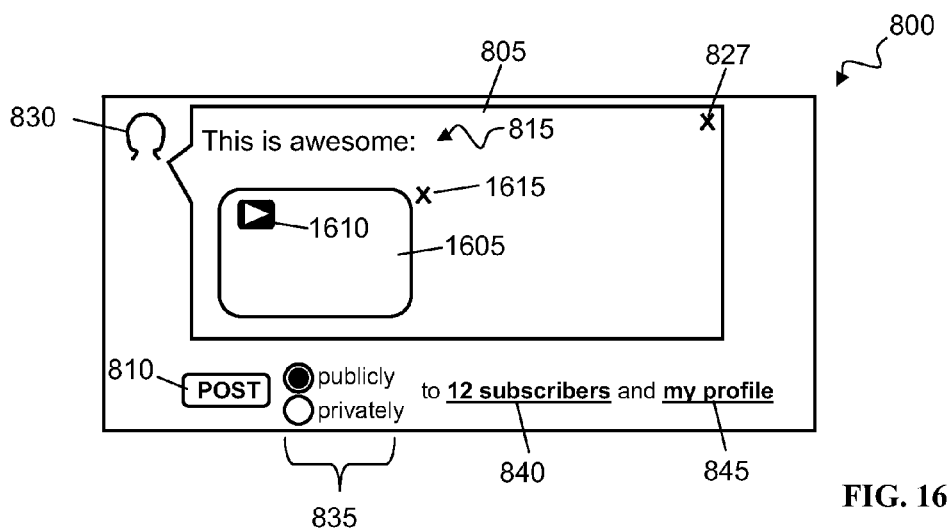
FIG. 16 is a schematic representation of the user interface of FIG. 8 presenting an indicator that video content is to be added to a post to an asymmetric social network.

FIG. 16 is a schematic representation of user interface 800 that includes an indicator 1605 that video content is to be added to a post to an asymmetric social network. User interface 800 can indicate that video content is to be added to the post in response to receipt of an indication that a device performing process 600 (FIG. 6) is to add the video content to a post. For example, if the device performing process 600 receives an identifier 905 of an electronic document that includes animation or other video content after it has been entered into either link entry field 1005 (FIG. 10) or into text entry box 805 (FIG. 9), the device performing process 600 can determine that the electronic document identified by identifier 905 includes the video content and add the video content to the post.

In the illustrated implementation, indicator 1605 is a thumbnail likeness of a frame from the video content in the electronic document identified by identifier 905. Indicator 1605 also includes an indicium 1610 indicating that the added content is in fact video content. In some implementations, indicium 1610 can be an interactive element that triggers presentation of the video content in the electronic document identified by identifier 905 in response to user interaction.

User interface 800 also includes a widget 1615 that is associated with indicator 1605, e.g., by virtue of adjacent disposition on user interface 800. Widget 1615 is an interactive display element that triggers, in response to user interaction, removal of the video content in the electronic document identified by identifier 905 from the post to the asymmetric social network and the deletion of indicator 1605 from text entry box 805.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method performed by a system of one or more data processing devices, the method comprising:
   receiving, at the system, an identification of an electronic document available online;
   identifying image content associated with the electronic document;
   filtering the identified image content;
   presenting the filtered image content to an author of a post to a social network, wherein the system allows for selection of more than one image;
   receiving a selection of at least a first image from amongst the presented image content; and
   adding at least the first image to the post to the social network,
   wherein the filtered image content is caused to be displayed in an order corresponding to a calculated probability for desirable inclusion in the post to the social network.

2. The method of claim 1, wherein filtering the identified image content comprises:
   identifying an advertisement in the electronic document; and
   separating the identified advertisement from the filtered image content.

3. The method of claim 2, wherein identifying the advertisement comprises categorizing an image having an aspect ratio equal to or greater than 3:1 as the advertisement.

4. The method of claim 1, wherein filtering the identified image content comprises:
   identifying at least one of an icon and a decorative element in the electronic document; and
   separating at least the one of the icon and the decorative element from the filtered image content.

5. The method of claim 4, wherein identifying at least the one of the icon and the decorative element comprises categorizing an image that is smaller than thirty pixels on any side as at least the one of the icon and the decorative element.

6. The method of claim 1, further comprising:
   presenting a likeness of a screenshot of the electronic document to the author of the post;
   receiving an approval of inclusion of the likeness of the screenshot of the electronic document in the post; and
   adding the likeness of the screenshot to the post.

7. The method of claim 1, further comprising displaying by a server and a mobile device a user interface that assists in authoring of the post to the social network.

8. A computer program product residing on a non-transitory computer readable medium having a plurality of instructions stored thereon which, when executed by a processor, cause the processor to perform operations comprising:
   receiving an identification of an electronic document available online;

identifying image content associated with the electronic document;

filtering the identified image content;

presenting the filtered image content to an author of a post to a social network, and allowing for selection of more than one image, wherein presenting the filtered image content comprises causing the filtered image content to be displayed in an order corresponding to a calculated probability for desirable inclusion in the post to the social network;

receiving a selection of at least a first image from amongst the presented image content; and adding at least the first image to the post to the social network.

9. The computer program product of claim 8 further comprising instructions for:

identifying an advertisement in the electronic document; and separating the identified advertisement from the filtered image content.

10. The computer program product of claim 9, wherein identifying the advertisement comprises categorizing an image having an aspect ratio equal to or greater than 3:1 as the advertisement.

11. The computer program product of claim 8, wherein filtering the identified image content comprises:

identifying at least one of an icon and a decorative element in the electronic document; and separating at least the one of the icon and the decorative element from the filtered image content.

12. The computer program product of claim 11, wherein identifying at least the one of the icon and the decorative element comprises categorizing an image that is smaller than thirty pixels on any side as at least the one of the icon and the decorative element.

13. The computer program product of claim 8 further comprising instructions for:

triggering presentation of a likeness of a screenshot of the electronic document to the author of the post;

receiving an approval of inclusion of the likeness of the screenshot of the electronic document in the post; and adding the likeness of the screenshot to the post.

14. A computing system, comprising:

at least one processor;

at least one memory architecture coupled with the at least one processor; and one or more software modules executed on the at least one processor and the at least one memory architecture, wherein the one or more software modules are configured to perform operations including:

receiving an identification of an electronic document available online;

identifying image content associated with the electronic document;

filtering the identified image content;

presenting the filtered image content to an author of a post to a social network, and allowing for selection of more than one image, wherein presenting the filtered image content includes causing the filtered image content to be displayed in an order corresponding to a calculated probability for desirable inclusion in the post to the social network;

receiving a selection of at least a first image from amongst the presented image content; and adding at least the first image to the post to the social network.

15. The computing system of claim 14 further configured to perform operations comprising:

identifying an advertisement in the electronic document; and separating the identified advertisement from the filtered image content.

16. The computing system of claim 15, wherein identifying the advertisement comprises categorizing an image having an aspect ratio equal to or greater than 3:1 as the advertisement.

17. The computing system of claim 14, wherein filtering the identified image content comprises:

identifying at least one of an icon and a decorative element in the electronic document; and separating at least the one of the icon and the decorative element from the filtered image content.

18. The computing system of claim 14, wherein identifying at least the one of the icon and the decorative element comprises categorizing an image that is smaller than thirty pixels on any side as at least the one of the icon and the decorative element.

19. The computing system of claim 14 further configured to perform operations comprising:

triggering presentation of a likeness of a screenshot of the electronic document to the author of the post;

receiving an approval of inclusion of the likeness of the screenshot of the electronic document in the post; and adding the likeness of the screenshot to the post.

20. The computer program product of claim 8 further comprising displaying a user interface that assists in authoring of the post to the social network.

* * * * *